Sept. 22, 1959  J. L. WISE  2,905,182
VERTICALLY ARRANGED THRESHING CYLINDER ASSEMBLY FOR COMBINES
Filed Oct. 15, 1957  2 Sheets-Sheet 1

INVENTOR
JOSEPH L. WISE

BY: Frederick C. Bromley
ATTORNEY

Sept. 22, 1959 J. L. WISE 2,905,182
VERTICALLY ARRANGED THRESHING CYLINDER ASSEMBLY FOR COMBINES
Filed Oct. 15, 1957 2 Sheets-Sheet 2

INVENTOR
JOSEPH L. WISE

BY: *Frederick E. Bromley*

ATTORNEY

US United States Patent Office 2,905,182
Patented Sept. 22, 1959

2,905,182
VERTICALLY ARRANGED THRESHING CYLINDER ASSEMBLY FOR COMBINES

Joseph L. Wise, Toronto, Ontario, Canada

Application October 15, 1957, Serial No. 690,313

17 Claims. (Cl. 130—27)

My invention relates to improvements in combined harvesters and has for its paramount object to provide a highly efficient machine of this kind characterized by its simplicity of construction with respect to the conventional type of harvester machine currently available on the market.

A further object of this invention is to provide a harvester of the kind referred to which is very reliable and sturdy and moreover, is of a particularly compact structure, adapted to be operated with facility for the separation of the grain from the straw with an optimum of efficiency and reliability. A still further object of the invention resides in the provision of a combined harvester so constructed as to possess a minimum number of moving parts, resulting in economy in both cost and manufacture and operation. My improved machine is brought about by a rotating drum structure and beater mechanism as well as other improved arrangements whereby the organization of the machine carries out the process of separating the grain in a highly efficient manner.

With the foregoing and subsidiary objects in view, the invention comprises a novel construction and arrangement of parts as hereinafter more specifically described and ascertained and illustrated in the accompanying drawing, showing a selected embodiment of the invention.

Figures 1, 3:
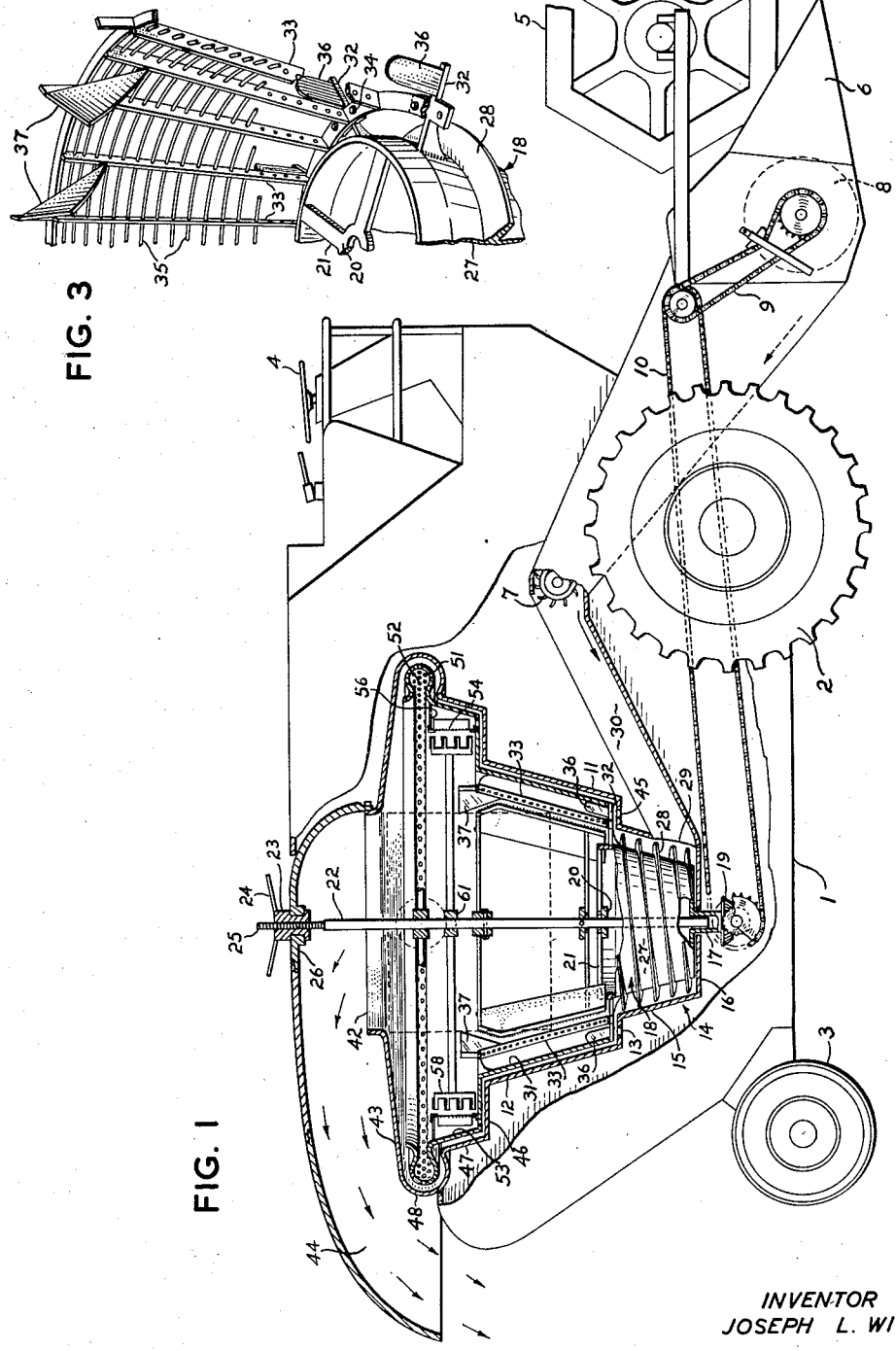
Fig. 1 is a side elevation of a combined harvester, broken away to illustrate in sectional elevation the improved structure of the present invention.
Fig. 3 is a fragmentary perspective view of the rotary grain unit together with a part of the lower delivery auger.

In carrying out my invention, I am employing a self-propelled vehicle, which is generally similar to the conventional combined harvester currently on the market. Such a machine includes a vehicle body generally denoted at 1, supported at its front end on land wheels 2, and at its rear end on the land wheels 3. The land wheels which include a conventional traction drive also provide for steering of the vehicle as customary as by means of a steering wheel indicated at 4, which is in proximity to the driver's seat where the necessary controls are located—not shown, as they do not form a part of the present invention.

It will be understood that a standard mower (not shown) is arranged at the front of the machine and powered by a transmission drive from the power plant with which such vehicle is equipped but which is not shown. The usual reel 5 cooperates with the mower in the cutting of grain, which is received in the scoop 6 and delivered to an endless inclining conveyor 7 by means of the usual auger 8, which is shown as driven by a chain 9, connected to the chain drive 10 which provides for rotation of the endless conveyor.

The improved mechanism of my invention comprises the thresher drum housing 11, which is suitably supported on the chassis of the vehicle and has an upwardly and outwardly inclined side wall 12 which is circular and is integral with a bottom wall 13 that is horizontally arranged and largely cut away to merge with a subjacent auger housing 14. This auger housing also has an upwardly and outwardly inclined side wall 15 and therefore resembles a truncated cone. A bottom wall 16 closes the auger housing and this bottom wall is centrally pierced to accommodate a journal 17 belonging to an auger 18. Bearing 17 rotatably mounts the auger in the housing 14 and the projecting portion of the bearing is connected to suitable gearing 19 which establishes a drive for the auger and is in turn connected to the power transmission of the vehicle.

The auger is also supplied with a bearing at its upper end indicated at 20. This bearing has connecting spider arms indicated at 21—best shown in Fig. 3. The bearing 20 turns on the fixed standard 22 which is a central member having its lower end freely seated in a recess provided in the lower bearing 17. The standard 22 extends upwardly and its upper end is supplied with means forming a support and also providing for endwise adjustment of the standard for purpose hereinafter to be dealt with. The supporting means is in the form of a nut 23 engaged with screw threads 25 on the upper end of the standard 22. The nut is collared in a fixed member 26 and is provided with one or more handles 24 by which it may be turned to feed the standard in either direction as may be required.

The auger 18 is preferably supplied with a large hollow hub 27 having a generally cylindrical wall which is inclined upwardly and outwardly in the form of a truncated cone. The auger leads into the opening provided in the bottom wall 13 of the housing 11 and has a helical blade element 28 which is desirably of a double pitch. At one side of the auger housing there is provided an opening 29. This opening is an entrance for grain, gravitating down the chute 30 from the endless conveyor 7. The auger acts on the grain to feed it upwardly by the usual worm action, well understood in the art.

The thresher drum rotates within the housing 11 and is connected as a unit with the auger. The thresher drum is generally indicated at 31 and comprises a generally cylindrical member which is inclined upwardly and outwardly in the form of a truncated cone having the same angle of inclination as the housing 11 and is spaced therefrom. The lower end of the thresher drum is open to provide an ingress and the upper end is open to make an egress. The cylindrical wall of the thresher drum is connected to the hub portion 27 of the auger as by means of a plurality of radial brackets 32 integral with the hub 27 and attached in approved manner to the cylindrical wall of the thresher drum. From this it will be understood that the thresher drum is rigid with the auger and that material is delivered into the thresher drum by rotation of the auger concurrently with the rotation of the thresher drum.

There is combined with the thresher drum an interiorly located rotary grate unit comprising a circular series of spaced bars 33 arranged substantially parallel to the axis of rotation and inclined upwardly and outwardly in parallel relation to the thresher drum side wall. The bars 33 are supported rigidly at their lower ends by attachment to the bracket 32 as best shown in Fig. 3 and the attachment is made as by bolts indicated at 34. The bars extend upwardly parallel to, but spaced from the side wall of the thresher drum and are united at spaced intervals throughout their length by means of circular rods 35 which are closely spaced but allow of separated grain passing through the spaces between adjacent bars. At the bottom of the thresher drum and outwardly of the bars 33 there is shown an arrangement of inclined impellers 36 which set up air circulation for acting on the material to assist in progressively advancing it in the separation process. It may also be desirable and there is shown a further circular series of impellers 37 supported on the upper ends of the bars 33 inwardly thereof and suitably sloped to assist in the advancing of the material undergoing the separation process.

Figure 4:
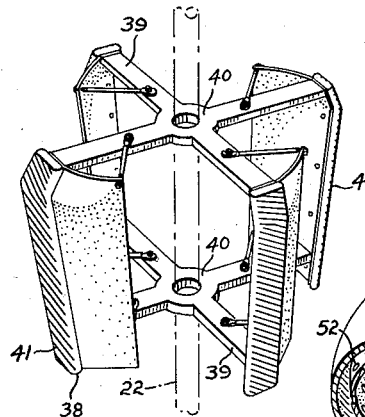
Fig. 4 is a perspective view showing the beater device.

The fixed heater unit detailed in Fig. 4 comprises a circular series of upwardly and outwardly sloped bars 38 rigidly supported by the radial arms 39 of upper and lower spiders 40 fixedly attached to the standard 22 in approved manner. Bars 38 have ribbed outer faces 41 which roughened faces co-act with the rotary grate unit to act on the grain to bring about separation from the straw. The bars 38 are in the form of plates whose roughened outer faces confront the bars 33 and the rods 35 of the rotary grate unit and are inwardly spaced therefrom and extend longitudinally therewith as will be seen from an inspection of Fig. 1. In the separation process, the straw is caused to pass upwardly centrally of the rotary grate unit and it finds its way to the central outlet 42 in the head portion 43 of the thresher drum whence it travels through the discharge duct 44 to the rear of the machine and flows therefrom. The straw may be allowed to drop onto the ground or it may be received in a receptacle according to customary practice in the harvesting of grain.

Figure 2:
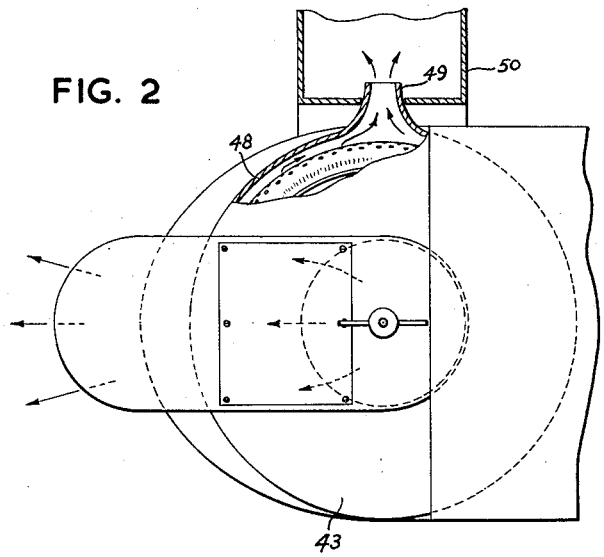
Fig. 2 is a top plan view, partly in section, depicting the rear portion of the machine showing how the grain is discharged into a receptacle such as a tank carried by the machine.

Desirably the wall portion 13 of the housing 11 may be supplied with a circular series of air inlet openings indicated at 45. The number and size of these openings may vary according to requirements. The top of the thresher housing 11 is shown as supplied with a horizontal flange 46 which has an upturned outer part 47 shaped to provide an annular channel 48 which is open to the interior of the thresher housing and forms a continuation of the head 43. This annular channel has at one side a spout 49 (Fig. 2) for discharge of grain into a receptacle such as a tank carried by the vehicle as indicated at 50. Within the channel 48 and spaced from the inner surface thereof is an annular pocket-forming member 51 perforated to provide openings as at 52 for passage of grain into the channel. This pocket-forming member is joined to the side wall of the thresher drum by a connecting wall 53 whereby the element 51 moves as a unit with the separator drum and forms an annular separator channel with the perforations in its peripheral portion for permitting clean grain to pass outwardly therethrough under centrifugal action.

Figure 5:
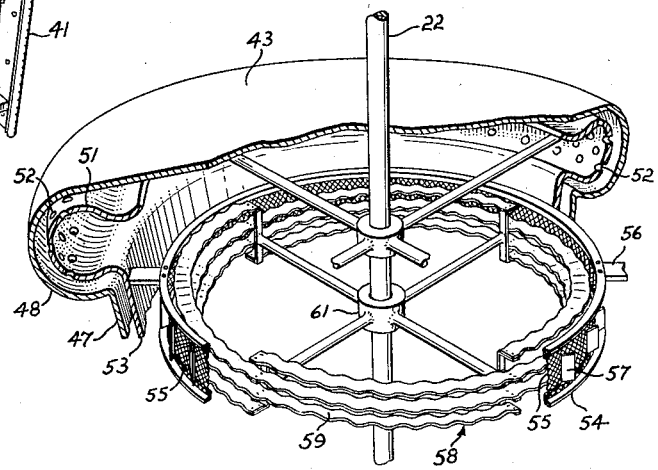
Fig. 5 is a perspective view of the upper separator device.

Below the annular separator channel 51 and within the connecting wall 53 there is provided the screen ring 54 of fine mesh screen material as indicated at 55 which is supported as by the lugs 56 connected to the wall element 53 for rotation with the rotary grate unit and the annular separator channel. This screen ring is desirably supplied with air scoops 57 outwardly thereof whereby the scoops act to direct air through the screen to assist in discharge of chaff in the cleaning of the grain. Inwardly of the screen ring there is shown an agitator device 58 in the form of a helical element 59 of several turns which is crimped throughout its length to form waves or undulations to promote agitation of grain. This agitating member is supported on radial arms united with a hub 61 secured on the standard 22, as best shown in Fig. 5.

According to the arrangement, grain separated from straw, flows upwardly and outwardly from the thresher drum and under centrifugal action travels through the agitator and into contact with the ring screen, thence into the annular pocket of separator channel from which it escapes through the perforations therein and is caught in the annular element 48 and swept around to the spout 49 from which it is discharged. If desirable, air intake holes may be provided in the wall member 47, said intake holes are not shown but may be suitably sized and located. It will be seen that the slope of the ribbed plates 38 and the inclination of the rotary grates 33 enable the stationary beater unit to be positionally varied to increase or decrease the intervening space between it and the rotary grate unit which can be affected by endwise adjustment of the standard 22. The adjustment as explained earlier is affected by turning the end nut 23.

From the preceding description it will be gathered that my invention provides a novel and improved combined harvester and that various changes and modifications may be resorted to as fairly come within the scope of the appended claims.

What I claim is:

1. In a combined harvester, a thresher drum housing having a bottom introductory opening and a top outlet opening, a material feeding device for translating material to said introductory opening, a thresher drum rotatably mounted within the confines of said thresher drum housing and having a bottom material inlet in register with said introductory opening, said thresher drum also having a top outlet opening, a rotary grate unit mounted to revolve about an axis coinciding with that of the thresher drum, means for rotating said grate unit and thresher drum, a beater device mounted interiorly of said rotary grate unit and having lateral plates supplied with outer roughened faces confronting said rotary grate unit in proximity thereto, and separator and chaff cleaning means at the top of said thresher drum.

2. In a combined harvester, a thresher drum housing having an upper outlet opening and having a bottom wall centrally cut away to provide an introductory opening, said bottom wall having a circular arrangement of perforations for admitting air into said housing, air circulating impellers rotatable in said housing for causing an upward flow of air, a material feeding device for translating material to said introductory opening, a thresher drum rotatably mounted within the confines of said thresher drum housing and having a bottom material inlet in register with said introductory opening, said thresher drum also having a top outlet opening, a rotary grate unit mounted to revolve about an axis coinciding with that of the thresher drum, means for rotating said grate unit and thresher drum, a beater device mounted interiorly of said rotary grate unit and having lateral plates supplied with outer roughened faces confronting said rotary grate unit in proximity thereto, and separator and chaff cleaning means at the top of said thresher drum.

3. In a combined harvester, a thresher drum housing having a bottom introductory opening and a top outlet opening, an auger housing centrally depending from said thresher drum housing and having a top opening registering with said bottom introductory opening, a driven auger vertically mounted in said auger housing for feeding material upwardly through said bottom introductory opening, a material delivery means communicating with a receiving opening provided in the lower part of said auger housing, a thresher drum rotatably mounted within the confines of said thresher drum housing and having a bottom material inlet in register with said introductory opening, said thresher drum also having a top outlet opening, a rotary grate unit mounted to revolve about an axis coinciding with that of the thresher drum, means for rotating said grate unit and thresher drum, a beater device mounted interiorly of said rotary grate unit and having lateral plates supplied with outer roughened faces confronting said rotary grate unit in proximity thereto, and separator and chaff cleaning means at the top of said thresher drum.

4. A structure as defined in claim 3, in which the auger housing has a side wall sloped upwardly and outwardly, and in which the auger comprises a large hollow hub shaped in the form of a truncated cone with helical blades therearound of a double pitch, the taper of the cone conforming to the slope of said side wall of said auger housing.

5. A structure as defined in claim 3, in which the auger is journalled in bearings centrally of said auger housing, and in which one of the bearings projects through the bottom portion of the auger housing and forms a part of an exterior drive.

6. A structure as defined in claim 1, in which the rotary grate unit is supplied with openings therethrough, and in which impellers are arranged in the bottom portion of the thresher drum outwardly of the rotary grate unit for upwardly impelling material passing outwardly through said openings in the rotary grate unit.

7. A structure as set forth in claim 1, in which the rotary grate unit comprises a circular series of spaced bars extending in a generally parallel relation with respect to the axis of rotation of the grate unit, and a plurality of circularly extending rods connected to said bars and spaced apart to allow separated grain to pass therethrough.

8. A structure as set forth in claim 1, in which the rotary grate unit comprises a circular series of spaced bars extending in a generally parallel relation with respect to the axis of rotation of the grate unit, and a plurality of circularly extending rods connected to said bars and spaced apart to allow separated grain to pass therethrough, and in which oblique impellers are mounted on the upper ends of said bars inwardly thereof.

9. A structure as set forth in claim 1, in which the material feeding device comprises a worm having a hub mounted to turn about a vertical axis, and in which the rotary grate unit is detachably supported upon said hub.

10. In a combined harvester, a thresher drum housing having a bottom introductory opening and a top outlet opening, a material feeding device for translating material to said introductory opening, a thresher drum rotatably mounted with the confines of said thresher drum housing and having a bottom material inlet in register with said introductory opening, said thresher drum also having a top outlet opening, a rotary grate unit disposed within said thresher drum and having a co-axial mounting, driving means for said thresher drum and said rotary grate unit, and a beater device mounted centrally within said rotary grate unit and having a spaced circular series of bars confronting said rotary grate unit and provided with ribbed outer faces.

11. A structure as set forth in claim 10, in which the rotary grate unit includes a circular series of bars which extend upwardly and outwardly and are integrated with a plurality of circularly extending spaced rods; and in which the bars of the beater device are inclined upwardly and outwardly similarly to said bars of the rotary grate unit, and are adjustable to and away from the rotary grate unit by axial movement of the beater device.

12. In a combined harvester, a thresher drum housing having a bottom introductory opening and a top outlet opening, a material feeding device for translating material to said introductory opening, a thresher drum rotatably mounted within the confines of said thresher drum housing and having a bottom material inlet in register with said introductory opening, said thresher drum also having a top outlet opening, a rotary grate unit mounted to revolve about an axis coinciding with that of the thresher drum, means for rotating said grate unit and thresher drum, a beater device mounted interiorly of said rotary grate unit, an annular inturned channel member on the top of said thresher drum housing and having a top wall centrally apertured to provide a head with a discharge opening above said thresher drum, an annular pocket member within the confines of said channel member and carried by said thresher drum, said annular pocket member having perforations for passage of grain into said channel member, and a spout at a side of said channel member for discharge of grain received therein.

13. A structure as defined in claim 12, in which a discharge duct is disposed overhead of the discharge opening in said head and directed to a side of the housing of the thresher drum.

14. A structure as defined in claim 12, in which a wall mounts the annular inturned channel member on the thresher drum housing, and in which said wall carries a screen ring.

15. A structure as defined in claim 12, in which a wall mounts the annular inturned channel member on the thresher drum housing, and in which the thresher drum and the annular inturned channel member are interposed by a ring screen which is rotatable therewith.

16. A structure as defined in claim 12, in which a rotary ring screen is interposed between the thresher drum and the annular inturned channel member and has air scoops thereon, and in which a helical agitator is mounted interiorly of said rotary screen ring.

17. In a combined harvester, a thresher drum having a lower ingress and an upper egress, grain delivery means whereby cut grain is delivered to said thresher drum, a rotary grate unit disposed within said thresher drum having a circular series of spaced grate bars arranged substantially parallel to the axis of rotation, and having spaced circular rods integrated with said bars throughout the length thereof; a beater device centrally disposed in said thresher drum interiorly of said bars and rods of said rotary grate and having ribbed plates confronting said bars and said rods for co-acting therewith in a threshing action; an annular separator drum at the upper part of said thresher drum and having a receiving side open to said upper egress and having a discharge orifice, and a rotary separator device in said separator drum provided with an annular separator channel having a perforated peripheral wall portion for permitting cleaned grain to pass outwardly therethrough under centrifugal action.

References Cited in the file of this patent
UNITED STATES PATENTS 2,212,819    Ahlmann  ---------------  Aug. 27, 1940